J. A. WILLITS.
APPARATUS FOR DIPPING ANIMALS.
APPLICATION FILED FEB. 18, 1909.
923,473.
Patented June 1, 1909.
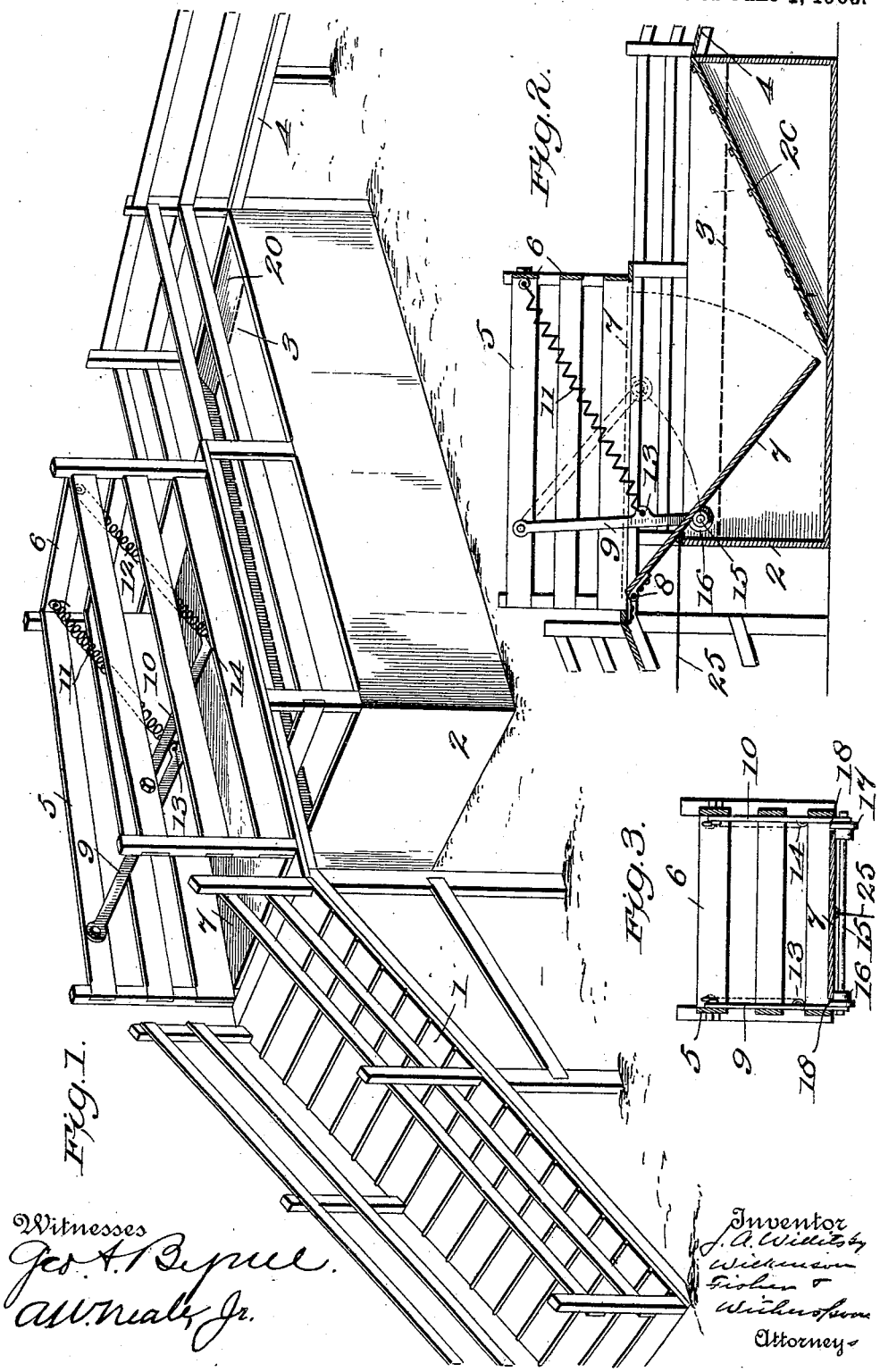

UNITED STATES PATENT OFFICE.

JAMES A. WILLITS, OF ALEDO, ILLINOIS.

APPARATUS FOR DIPPING ANIMALS.

No. 923,473.  Specification of Letters Patent.  Patented June 1, 1909.

Application filed February 18, 1909. Serial No. 478,571.

*To all whom it may concern:*

Be it known that I, JAMES A. WILLITS, a citizen of the United States, residing at Aledo, in the county of Mercer and State of Illinois, have invented certain new and useful Improvements in Apparatus for Dipping Animals; and I do hereby declare the following to be a full, clear, and exact description of the invention, such as will enable others skilled in the art to which it appertains to make and use the same.

My invention relates to apparatus for dipping animals, and has for its object to provide an inexpensive and an efficient automatic dump especially adapted for bathing hogs or other animals in a chemical solution in order to treat certain well known diseases which they commonly have.

To these ends the invention consists in the details of construction and combinations of parts more fully hereinafter disclosed and particularly pointed out in the claims.

Referring to the accompanying drawings forming a part of this specification:—Figure 1 is a perspective view of my apparatus complete. Fig. 2 a sectional view of the automatic dump and tank, and Fig. 3 a transverse sectional view of the dump alone.

1 indicates any suitable passage way; 2 any suitable tank or container of a chemical solution; 3 the solution therein; and 4 a suitable passage way leading from the tank 2. Above the tank is located the dump proper consisting of a frame work having a closed end 6, and a bottom 7 pivoted at 8. Pivotally attached to the framework 5 are two arms 9 and 10, controlled by the springs 11 and 12 also attached to the frame work at their upper ends and attached at their lower ends to lugs 13 and 14 on the arms, as shown.

A rod 15 preferably joins the extreme lower ends of the arms underneath the bottom 7, and is provided with rollers 16 and 17 upon which said bottom is supported. Each of the rollers has a flange 18 extending up between the outer edge of the bottom and the inside wall of the frame, which serve to guide the rollers in their travel under the bottom as will be readily understood. The tank is also preferably provided with a suitable inclined passage way 20 leading out of the same and into the passage way 4.

The operation of my improved hog or animal dump is as follows:—The animals are driven along the passage 1 and on to the floor 7, which is normally supported by the rollers 16 and 17 occupying a position slightly forward of the center of said floor, as is indicated in dotted lines Fig. 2. When the floor is subjected to sufficient weight forward of its shifting support formed by the rollers 16 and 17, the said floor descends, and the said shifting support retreats against the tension of the springs 11 and 12, as indicated in full lines Fig. 2. This action causes the animals which were at first behind the shifting support to lend their weight to those in front of it, and therefore when the floor once begins to tilt, it rapidly and evenly slides all the animals into the bath below. In other words, the floor remains firm until it is loaded, when the animals are evenly and rapidly slid into the bath with as little fright as possible. In some cases it is desirable to start the dipping with a less load than in others, and to accomplish this I may provide a string 25 or other means by which the shifting pivot may be forced to the rear at any desired time. After the animals are dipped they find their way out up over the passage 20, and along the passage 4.

What I claim is:—

1. In an apparatus for dipping animals, the combination of a frame-work closed at one end and open at the other; a floor for said frame work; a permanent pivot for said floor at said open end; and a shifting support for said floor adapted to travel toward said open end, substantially as described.

2. In an apparatus for dipping animals, the combination of a frame work having a closed and an open end; a floor in said frame work pivoted to the same at its open end; an arm attached to said frame work and extending beneath the floor; a roller attached to said arm and supporting said floor; and a spring controlling said arm and roller, substantially as described.

3. In an apparatus for dipping animals, the combination of a frame work having a closed and an open end; a floor in said frame work pivoted to the same at its open end; a pair of arms attached to said frame work; a rod joining said arms underneath said floor; and a pair of rollers on said rod and constituting a shifting support for said floor, substantially as described.

4. In an apparatus for dipping animals, the combination of a frame work having a closed and an open end; a floor in said frame work pivoted to the same at its open end; a pair of arms attached to said frame work; a rod joining said arms underneath said floor; a pair of rollers having flanges taking against the edges of said floor forming a shifting support and a pair of springs for normally keeping said shifting support forward of the center of said floor, substantially as described.

In testimony whereof, I affix my signature, in presence of two witnesses.

JAMES A. WILLITS.

Witnesses:
N. H. GUTHRIE,
W. C. SELLS.